MILK COVER

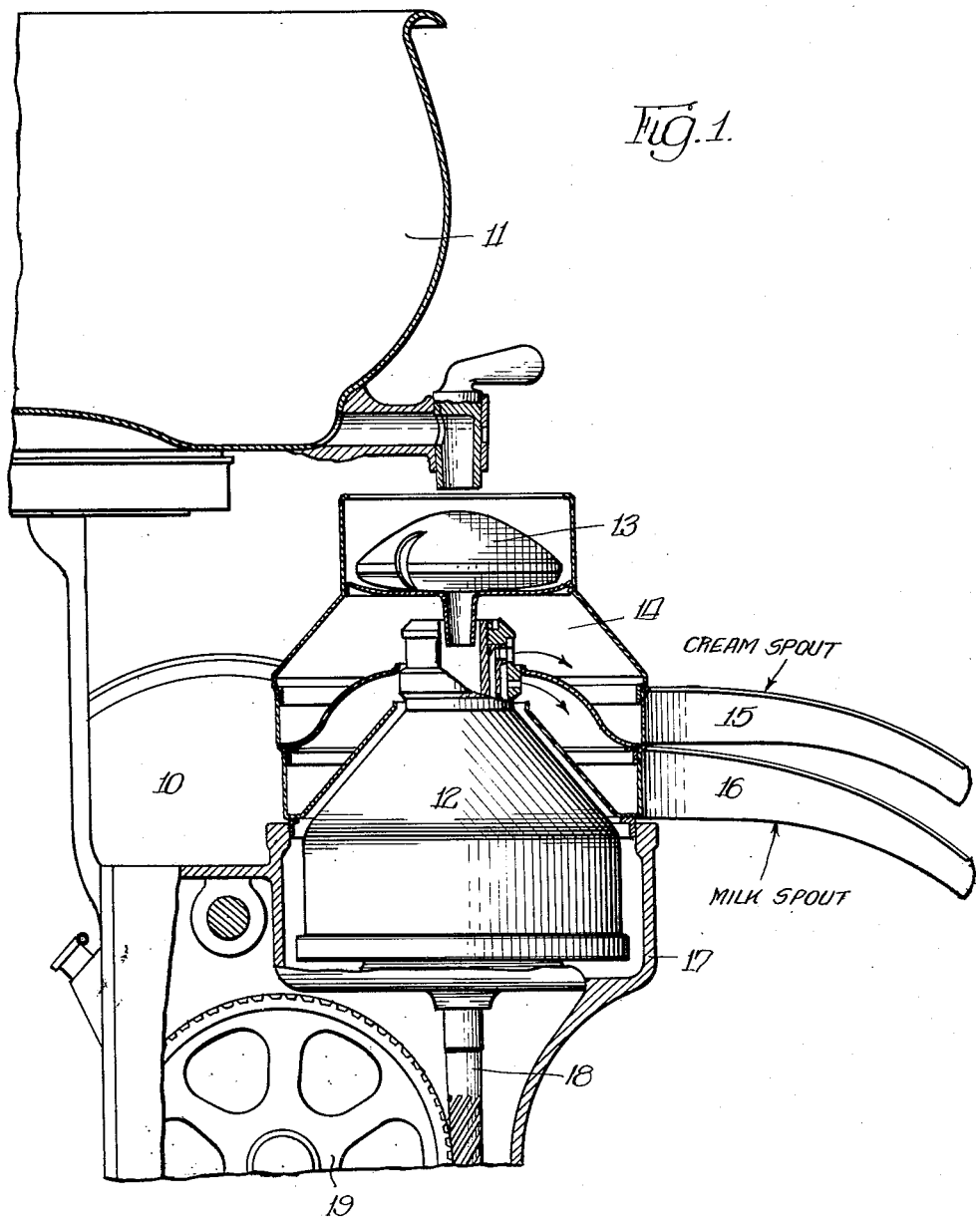

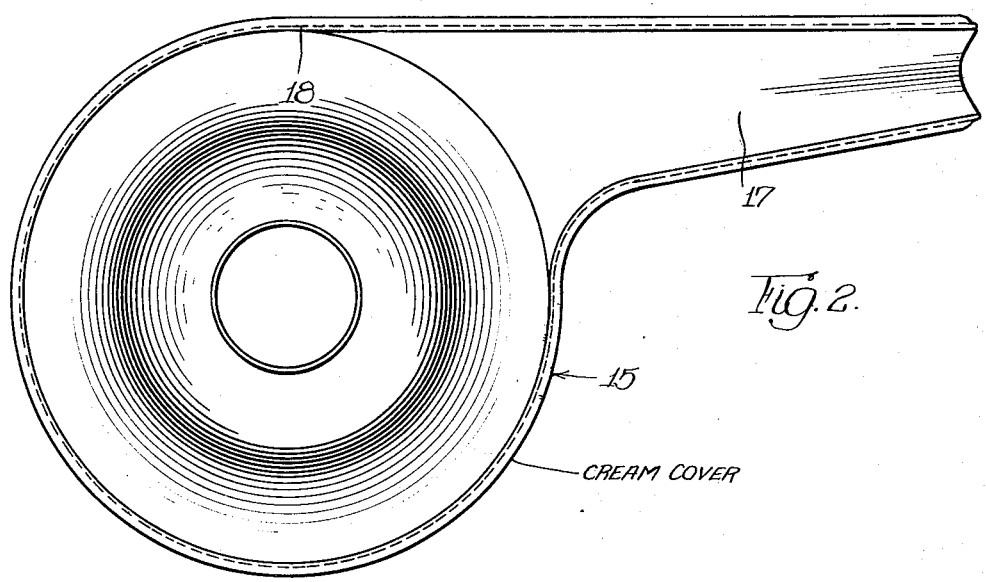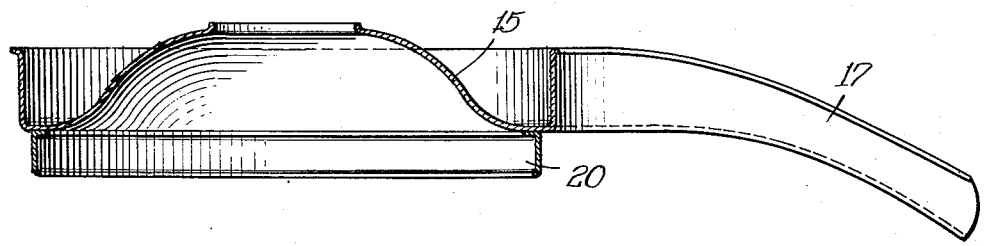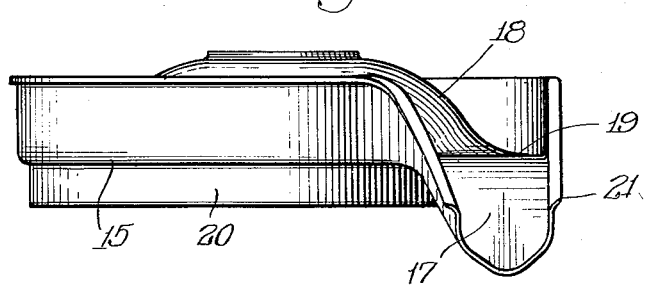

Patented July 3, 1945

2,379,647

UNITED STATES PATENT OFFICE 2,379,647

CENTRIFUGAL SEPARATOR PAN

Richard W. Muerle, Springfield, Ill., assignor to Montgomery Ward & Co., Incorporated, Chicago, Ill., a corporation of Illinois Application December 8, 1941, Serial No. 422,028

10 Claims. (Cl. 233—1)

This invention has to do primarily with an improvement in what is generally termed cream covers and skim milk covers for cream separators and the like.

For a number of years, centrifugal cream separators had been in use to separate butter fat from whole milk. The separated butter fat, in the form of cream, is discharged from a rapidly rotating separator bowl into a cream cover which catches and conducts the cream from the separator to where it is discharged into buckets or other containers. The skim milk is discharged from another portion of the rotating separator bowl, into another generally similar structure known as a skim milk cover. In the past, it has been customary to make these covers of several pieces, generally steel stampings, and weld or solder the parts together to form a complete unit.

Since milk is a highly perishable product, and the utmost importance is attached by State, city and dairy inspectors and the like to all surfaces and passages contacted by the milk products during the process of separation, it is highly desirable that there be no ridges, roughly soldered seams, poor joints between spout and frame, and portions which resist regular efforts at cleaning. Despite this fact, even the latest styles of tinware (as these skim milk and cream covers are generally designated) have rough joints, crevices and portions that resist cleaning, and covered spouts. It is an object of this invention to provide a structure and method of making it, which will overcome these objections.

It is the object of applicant's invention to eliminate soldering or other jointer of parts and surfaces used in the conduction of the milk and cream in the construction of this tinware.

It is a further object of applicant's invention to provide a construction which may be manufactured with less operations and fewer tools and dies than other devices used for the same purpose.

It is still a further object of applicant's invention to provide cream covers and skim milk covers which are stamped from a single piece of metal. In this connection, frequently trouble in manufacturing is encountered where different metals are used for different stampings due to the fact that these metals may not be of the same chemical composition. In such condition the tinning or plating which is necessary to prevent corrosion and make the unit sanitary, may be accomplished more easily on one piece of metal than it may on another. Frequently, the pieces of metal constituting one assembly, such as a cream cover will be made of different qualities of metal (from a chemical standpoint). Perhaps one piece becomes sufficiently plated before another is even partially plated, and difficulties are encountered in securing the uniformity of coloring in plating which is so necessary for articles of this type subject to frequent inspection.

It is a further object of this invention to provide a device which has a certain amount of springiness so that the assembly of the cream and milk covers into operating position will result in a construction which does not rattle, which has a secure grip between mating parts.

Other objects and advantages of the invention will appear as the nature of the improvements is better understood, the invention consisting substantially in the novel construction, combination and arrangement of parts hereinafter fully described, illustrated in the accompanying drawings, and finally pointed out in the appended claims.

In the drawings:

Figure 1 is a fragmentary vertical sectional view showing a portion of an ordinary cream separator with the cream spout and the milk spout in operating position thereon. This figure is partly cross-sectioned to show pertinent parts of the device;

Figure 2 is a top plan view of a cream spout incorporating my new construction;

Figure 3 is a longitudinal, cross-sectional, elevational view, showing the device of Figure 2;

Figure 4 is a vertical elevational view looking directly into the spout portion of the device of Figure 3;

Figure 5:
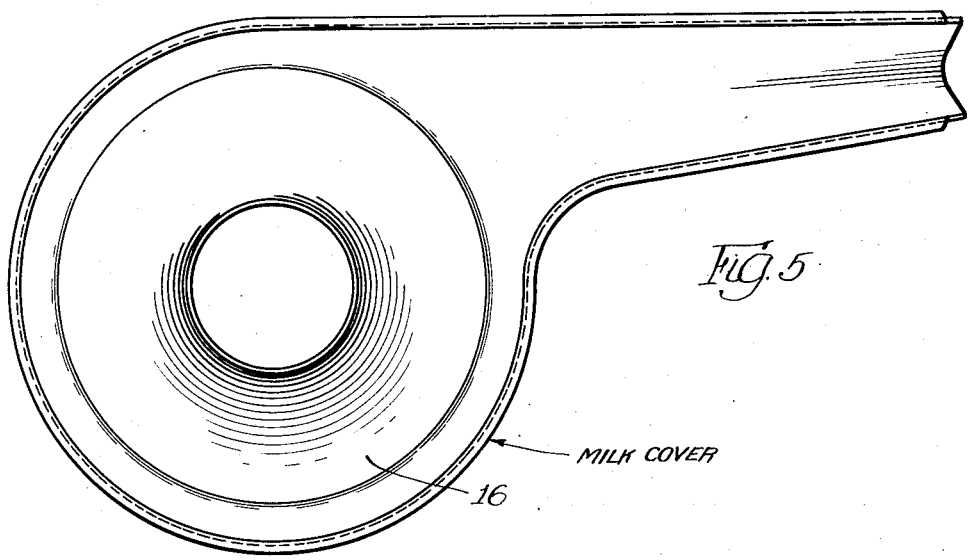
Figure 5 is a view similar to that of Figure 2, but showing the skim milk cover.

Referring more in detail to the construction shown in the various figures, and particularly to Figure 1, 10 designates, in general, a cream separator of the centrifugal type. It is provided among other things with the milk supply can 11, into which the milk to be separated is poured, with the separator bowl 12, float 13, the portion which will here be designated as the float supporting cover 14, the cream cover 15, the milk cover 16, the latter two of which form the principal subject matter of this invention, the separator bowl housing 17, the spindle 18 which is used for driving the separator bowl, and the driving gear 19.

Referring in particular to the construction shown in Figures 2, 3 and 4, which is the cream cover designated in its entirety as 15, I have provided a construction which is readily stamped out of a single piece of metal using ordinary machinery and dies with the exception of the mating flange 20. A single sheet of metal such as lightweight steel is placed in the dies and the spout 17 and frame 18 and bottom 19 are stamped therefrom in a series of operations known as "draws." That is, the forming is partially done in what is known as a first draw and is continued in a second and additional draws until it is completely formed, trimmed and finished in its final dimensions. The unit is thus made from a single piece of metal.

This forms the device as an open spout which is easily cleaned, and the frame 18 and bottom 19 merge into the spout 17 without a seam and with the various parts having generous radii which will not retard cleaning. Heretofore, the greatest difficulty has been experienced in connecting the spout to the frame and bottom, and to my knowledge there is no construction on the market which does so without welding or soldering, and with a complete elimination of seams and angles. The open spout is cleaner than the closed spout first, because it is not necessary to form a seam, and secondly because a closed spout does not offer ready access for thorough cleaning. Further, the elimination of sharp angles is seldom possible in a closed spout, and a closed spout must be joined to the rest of the structure by special operations.

As shown in my construction, I have provided the reinforcing flange 21 which adds strength to the construction and springiness and flexibility so that the stacking of the float supporting cover on the cream cover in assembling the units for operation is readily accomplished. With this arrangement, the diameter of the mating flange of the float supporting cover which slips into the inner periphery of the cream cover may be substantially that of the cream cover, assuring a tight fit which will eliminate rattling and will provide a good grip between the mating parts.

The mating flange is spot welded or otherwise attached to the bottom 19 of the cream cover. The mating flange 20 is preferably spot welded to the bottom 19 of the cream cover. This mating flange renders itself readily to what is known as a coining operation which is performed after the flange has been spot welded to the main frame. This coining operation is usually performed with a heavy press under considerable pressure and joins the flange to the main frame and rounds the edges to such an extent that no seam is apparent after the entire unit has been dipped into tin, and appears to all practical purposes as one piece. In actual operation neither cold milk nor cream ever reaches this lower flange, but skim milk does spray against the same as it runs off into the skim milk frame. Skim milk is a by product and is used in most cases for feeding livestock. Even so, there should be no seams anywhere on the tinware where bacteria can breed and the jointure between the flange 20 and the frame as formed above is of such a satisfactory type that there is no seam left, in the ordinary sense of the word.

Figure 6:
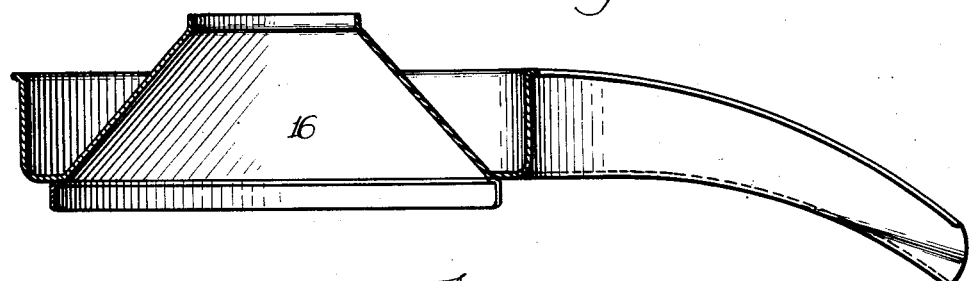
Figure 6 is a view similar to Figure 3 but illustrating the device of Figure 5.
Figure 7:
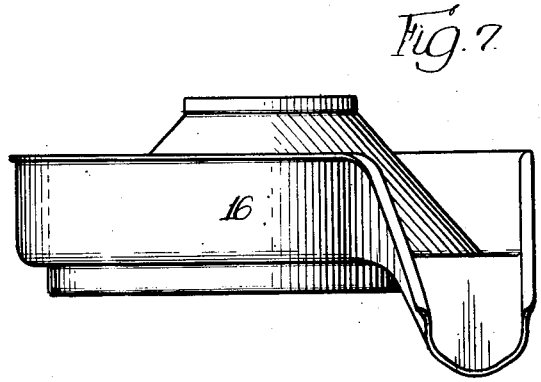
Figure 7 is a view similar to that of Figure 4, but illustrating the device of Figure 5.

Referring to the construction shown in Figures 5, 6 and 7, the proportions are slightly different than those of Figures 2, 3 and 4 but the construction and parts are otherwise identical. Accordingly, no separate description is believed necessary and the observations with respect to Figures 2, 3 and 4 are equally applicable to Figures 5, 6 and 7 with the exception that the cream cover fits over the milk cover in the same manner as the float supporting cover 14 fits over the cream cover 15. The cream cover is designated herein as 16.

It will be understood that after these units 15 and 16 are formed, they are generally dipped into molten tin which protects the surfaces against corrosion, and makes them more sanitary.

The mating flange 20 is stamped out of a single piece of metal in a single operation.

When it is noted that the cream and milk covers must be assembled and disassembled at least twice a day in normal operation, and thoroughly cleaned so as to pass inspection and be sanitary, it will be readily seen that the simplified and sanitary construction of applicant's arrangement has advantages.

The form of the invention herein shown and described presents a preferred embodiment thereof, and delineates its adaption to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claims.

I claim:

1. In a centrifugal discharge receiving pan and cover, an annular receiving pan having a side wall with a spout gap therein and an annular integral centrally elevated bottom to provide in combination with the side wall an annular open top receiving trough, and an open top spout integral with said pan having a substantially flattened base portion at its inner end extending outwardly from said bottom, and side walls, one of which is integral with and extends outwardly from the first mentioned side wall of said pan and the other of which extends outwardly from said side wall on the other side of said gap in a smooth bend, and a stiffening flange extending continuously around the upper edge of the pan side wall, and continuously along the upper edges of the spout side walls.

2. In a centrifugal discharge receiving pan and cover an annular receiving pan having a side wall with a spout gap therein and an annular integral centrally elevated bottom to provide in combination with the side wall an annular open top receiving trough, and an open top spout integral with said pan having a substantially flattened base portion at its inner end extending radially and tangentially outward from said bottom, and side walls, one of which is integral with an extends substantially tangentially from the first mentioned side wall of said pan and the other of which extends substantially radially from said side wall in a smooth bend, and a stiffening flange extending radially outwardly and extending continuously around the upper edge of the pan side wall, and continuously along the upper edges of the spout side walls.

3. In a centrifugal discharge receiving pan and cover an annular receiving pan having a side wall with a spout gap therein and an annular integral centrally elevated bottom to provide in combination with the side wall an annular open top receiving trough, and an open top spout integral with said pan having a substantially flattened base portion at its inner end extending radially and tangentially outward from said bottom, and side walls, one of which is integral with and extends substantially tangentially from the first mentioned side wall of said pan and the other of which extends substantially radially from said side wall in a smooth bend, a stiffening flange extending continuously around the upper edge of the pan side wall, and continuously along the upper edges of the spout side walls and an annular nesting flange secured to the under side of said bottom for cooperating and mating with the side wall of a second annular receiving pan.

4. In a centrifugal discharge receiving pan and cover an annular receiving pan having a side wall with a spout gap therein and an annular integral centrally elevated bottom to provide in combination with the side wall an annular open top receiving trough, and an open top spout integral with said pan having a substantially flattened base portion at its inner end extending radially and tangentially outward from said bottom, and side walls, one of which is integral with and extends substantially tangentially from the first mentioned side wall of said pan and the other of which extends substantially radially from said side wall in a smooth bend, a stiffening flange extending radially outwardly and extending continuously around the upper edge of the pan side wall, and continuously along the upper edges of the spout side walls and an annular nesting flange secured to the under side of said bottom for cooperating and mating with the side wall of a second annular receiving pan.

5. An annular centrifugal separator pan and open top channel spout formed from a single integral sheet of metal, said pan portion comprising an annular open top trough, the edge of the inner wall of which defines an aperture to receive the centrifuge discharge device, and the outer wall of which is circular and discontinuous at the spout, and merges continuously and without break with the side walls of the channel walls of said spout, the upper edge of said outer wall being provided with a flared flange uniformly spaced above the plane of the base of said trough.

6. An annular centrifugal separator pan and open top channel spout formed from a single integral sheet of metal, said pan portion comprising an annular open top trough, the edge of the inner wall of which defines an aperture to receive the centrifuge discharge device, and the outer wall of which is circular and discontinuous at the spout and merges continuously and without break with the side walls of the channel walls of said spout, the upper edge of said outer wall being provided with a flared flange uniformly spaced above the plane of the base of said trough, said flange continuing without interruption along the upper edges of the side walls of said spout channel.

7. An annular centrifugal separator pan and open top channel spout formed from a single integral sheet of metal, said pan portion comprising an annular open top trough the edge of the inner wall of which defines an aperture to receive the centrifuge discharge device, and the outer wall of which is circular and discontinuous at the spout and merges continuously and without break with the side walls of the channel walls of said spout, the upper edge of said outer wall being provided with a flared flange uniformly spaced above the plane of the base of said trough, said flange continuing without interruption along the upper edges of the side walls of said spout channel, and an annular skirt depending from the bottom of said trough, the diameter of which is slightly different from that of the circular wall.

8. In a vertical axis centrifugal separator having a separator radially outward discharge level, in combination, a receiving pan for said radially outward discharge level, comprising a single one piece pan having an annular open top trough and open top channel spout extending outwardly therefrom, the pan having an outer substantially vertical discontinuous circular wall of substantially uniform height broken only by said spout, said wall on either side of said spout merging without break into the respective side walls of said spout, and an associated means acting as a cover for said pan, having an annular depending circular skirt of a diameter slightly different from said circular wall whereby to produce a tight grip between said skirt and wall when telescopically embraced, flared means on one of said skirt or wall to facilitate telescoping one on the other, and means for limiting the axial telescoping of said parts to a distance substantially less than the height of said wall.

9. In a vertical axis centrifugal separator having two or more axially spaced separator radially outward discharge levels, in combination a receiving pan for each of said levels, the upper and lower receiving pans each comprising a single one piece pan having an annular open top trough and open top channel spout extending outwardly therefrom, the lower pan having an outer substantially vertical discontinuous circular wall of a substantially uniform height broken only by said spout, said wall on either side of said spout merging without break into the side walls of said spout and the upper pan having a short annular depending skirt of diameter slightly different than that of said circular wall, whereby insertion of said skirt into telescopic engagement with said circular wall will spring said wall to vary its diameter and provide a tight engagement between the parts, flared means on one of said wall and skirt for facilitating the telescopic engagement of said skirt and side wall and means for limiting the length of telescopic engagement between said skirt and side wall.

10. An annular centrifugal separator pan and open top channel spout formed from a single integral sheet of metal, said pan portion comprising an annular open top trough, the edge of the inner wall of which defines an aperture to receive the centrifuge discharge device, and the outer wall of which is circular and discontinuous at the spout, and merges continuously and without break with the side walls of the channel walls of said spout.

RICHARD W. MUERLE